United States Patent Office 3,209,151
Patented Sept. 28, 1965

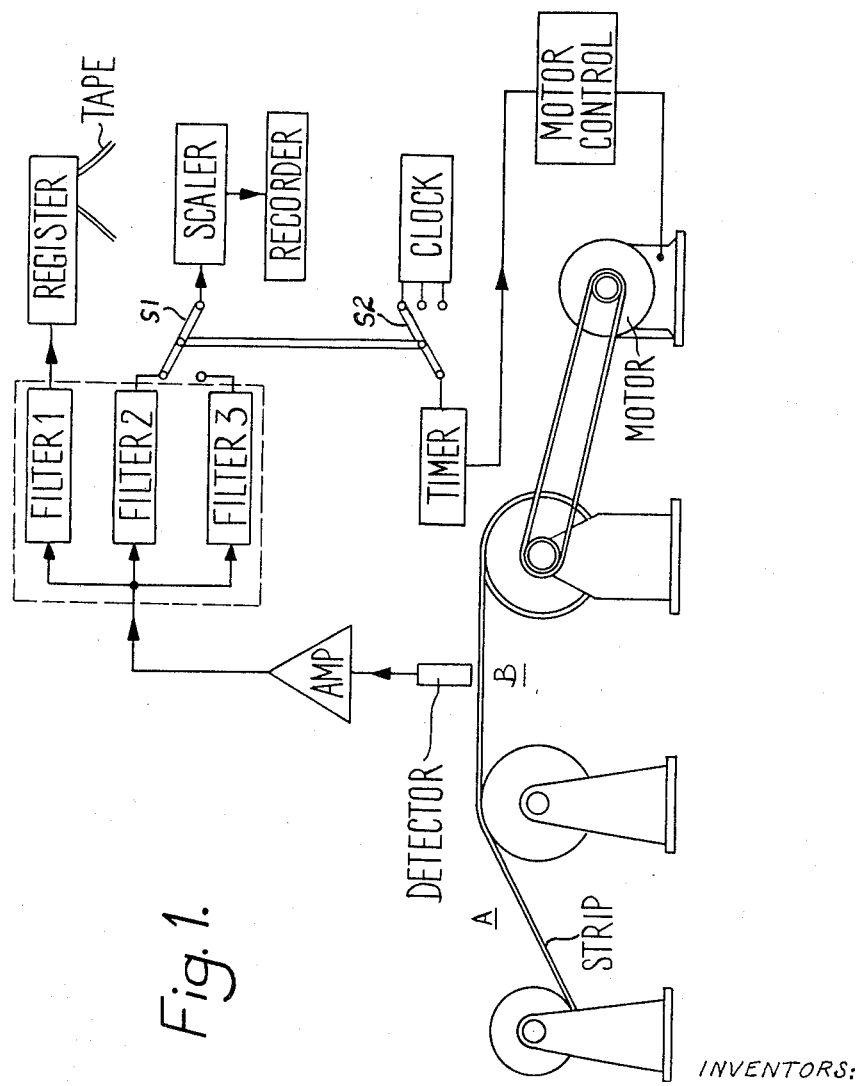

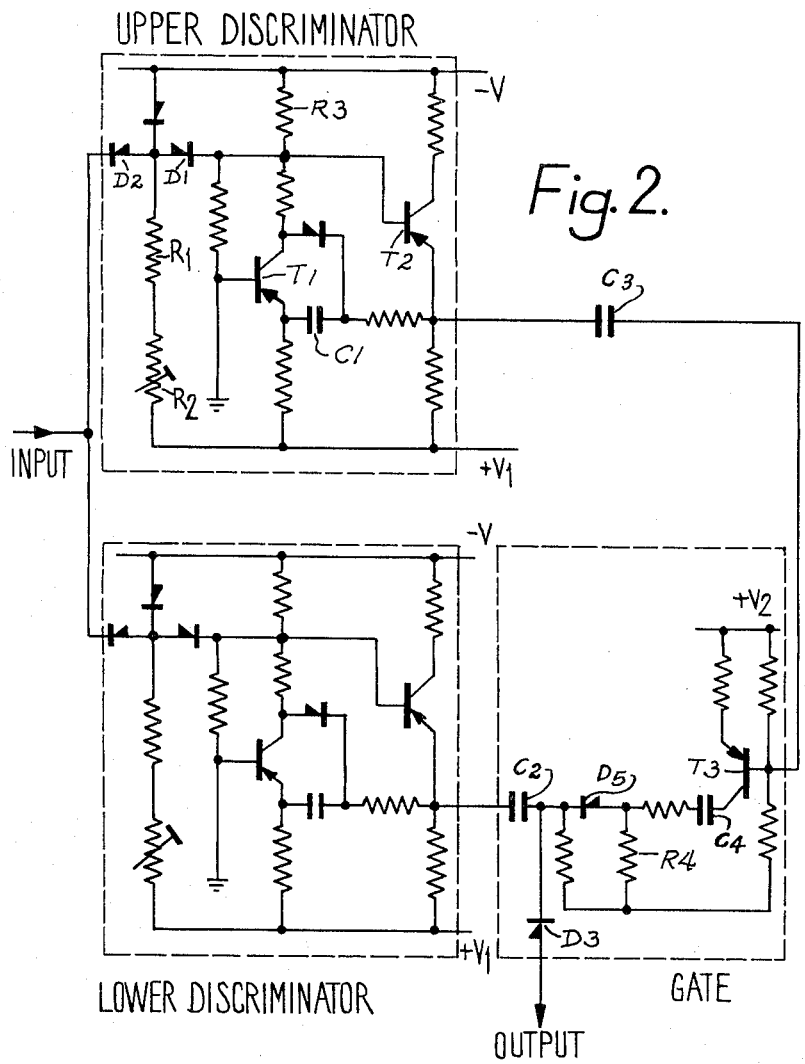

3,209,151
RADIATION DETECTOR AND DISCRIMINATOR UTILIZING A SEMI-CONDUCTOR SOLID STATE DETECTOR
Dennis Allenden, Beenham, near Reading, Keith Boddy, Woodley, Reading, David Vernon Freck, Basingstoke, and Stanley Ernest Hunt, Reading, England, assignors to Associated Electrical Industries Limited, London, England, a British company
Filed Sept. 13, 1962, Ser. No. 223,355
Claims priority, application Great Britain, Sept. 18, 1961, 33,369/61
3 Claims. (Cl. 250—83.3)

This invention relates to radiation detectors.

More particularly the invention is concerned with the detection of radioactive material in gases, e.g. in the atmosphere and especially for detecting plutonium and uranium.

The radiation hazards associated with plutonium and uranium are principally from inhalation and ingestion of these elements. From the recommendations of the I.C.R.P. Committee II for the protection of personnel the limiting maximum permissible concentrations (m.p.c.) in air of these elements are $2 \times 10^{-12}$ µc./cc. and $6 \times 10^{-11}$ µc./cc. respectively. Current practice is to monitor the air continuously in work regions subject to this contamination.

Determination of such small concentrations is complicated by the presence of radon in the atmosphere, the concentration of which can vary according to a number of factors. The natural alpha activity arising from the radon decay chain is generally of the same order as that of 1 m.p.c. of natural uranium, i.e. $6 \times 10^{-11}$ µc./cc., and hence this makes it difficult to distinguish between the presence of radon which is comparatively harmless and that of uranium or plutonium.

The principal known methods of monitoring the air involve the collection of dust from the air usually on filter paper, e.g. by suction or by impaction. Conventional alpha particle detectors using a zinc-sulphide screen, photo-multiplier, etc. then count the activity presented to them. Correction for the radon background is generally made by allowing this activity either to decay to a negligible level, or to decay partially to some calculable fraction.

In the first method the filter paper is left for some days before counting and the long-lived activity remaining is counted and assumed to be uranium and/or plutonium.

In the second method the total activity is counted immediately and time then allowed for the radon activity to decay to some known fraction and the total activity then counted once more. Multiplication of the difference in the count rates by some scaling factor then yields the radon background activity. This is subtracted from the total activity and the remainder is assumed to be the activity attributable to uranium or plutonium, but is not generally identifiable.

A delay of the order of days is involved in obtaining results by the first method while even with the more complicated and expensive apparatus of the second method, delays of up to an hour are commmon. In the latter case, the delay is caused by the long sampling period required for detection, both counting times, and the decay time.

The main object of the present invention is to provide apparatus for continuously sampling air in a manner to provide an immediate indication of an inhalation hazard.

According to the present invention apparatus for detecting radiation in gases comprises a semi-conductor solid state detector, means for locating a strip of material which has been exposed to gas to be tested in operative relationship with said detector and means for applying an electrical pulse output from said detector to selector circuits, each of which passes pulses of an amplitude corresponding to a selected radiation energy band to a pulse counter or detector.

The term solid state conductor implies a semi-conductor barrier layer of P-N junction which is back biased so that normally negligible current flows. When however, alpha particles impinge on the semi-conductor and penetrate to the region of the barrier or junction electrical pulses pass which may be detected in an external electrical circuit. The junction may be made of germanium or silicon diffused with lithium.

In order that the invention may be more clearly understood reference will now be made to the accompanying drawing in which:

FIG. 1 shows diagrammatically an example of apparatus embodying the invention; and FIG. 2 shows an example of a discriminator circuit and a gating circuit which can be used as a scaler in FIG. 1.

In the arrangement shown a strip of material is exposed to a gas to be sampled and then passed to the region of a detector. The strip which may, for example, be paper coated with a suitable adhesive is exposed to the gas in the region A for some predetermined period.

At the end of the sampling period the paper is automatically moved to the region B and presented to the detector. The detector, as above mentioned, is a solid state detector, i.e. a P-N junction, which is back biased so that normally it is cut off, but when exposed to alpha radiation it passes electrical pulses which are passed to an amplifier to a level suitable for pulse height analysis. The electrical pulses are fed to an analyser circuit comprising filters each of which is designed to pass pulses of a selected pulse height and corresponding to a selected alpha particle energy. For example they may be arranged to select PU–239, U–235 and U–238 alpha particle energies. The discrimination level is varied to record one or other of these alpha particle groups for a previously determined time. In the arrangement shown in FIG. 1 a selector switch S1 connects either the filter No. 2 or filter No. 3 to a scaler circuit, it being assumed that when the switch is up it will pass the output of filter No. 2 to the scaler so that the scaler will count pulses due to uranium but when the switch S is down it will count pulses due to plutonium.

Clearly this is by way of example only as there may be any number of filter circuits depending upon the use to which the device will be put.

Typical discrimination and gate circuits are shown in FIG. 2 but it is emphasised that these are given by way of example and do not restrict the claims to the use of these circuits and/or minor variations thereof.

The two discriminators are identical and only the upper discriminator will be described. Transistor T1 and T2 are both normally conducting. T1 has its base at earth potential and its emitter returned to a positive voltage. T2 has its emitter returned to the same positive voltage and its base connected to T1 collector. There is capacitive coupling through capacitor C1 between the two emitters. Diode D1 is normally conducting to a degree determined by the resistors R1 and R2, the latter being adjustable. The circuit tends to be unstable but in its normal state is prevented from triggering by the current flow through diode D1 which clamps the base of transistor T2 at the threshold value and reduces the loop gain to less than unity. Negative input pulses are applied through diodes D2. If the pulse amplitude equals or exceeds a threshold value, D1 ceases to conduct and the current which is normally carried no longer flows through resistance R3. A negative going voltage is applied to the base of transistor T2 which allows the circuit to trigger and the input pulse is reproduced at the emitter of transistor T2 as an output pulse. The output pulse is terminated by regenerative turnoff in transistor T1 due to the coupling capacitor C1, the output pulse terminated by capacitor C1 charging through the emitter resistors in the normal manner of an emitter-coupled monostable multivibrator. The two discriminators are identical except for their threshold settings, these being so adjusted that the lower discriminator triggers if the input pulse is greater than that corresponding to the lower energy limits of the channel but the upper one triggers if the input pulse is greater than that corresponding to the upper energy limits of the channel. Hence, a pulse of correct height will trigger the lower but not the upper discriminator. A pulse corresponding to lower energy than the channel triggers neither and a higher energy pulse triggers both. The electronic gate is necessary to prevent spurious output in the latter case. If only the lower discriminator triggers, a negative pulse will be applied through capacitor C2 and diode D3 to the output. If, however, the upper discriminator also triggers, a pulse will be applied through capacitor C3 to the base of transistor T3; this in turn will apply a positive pulse through capacitor C4 and diode D5 to the upper side of diode D3 which will cut off and prevent the pulse from the lower discriminator from passing to the output.

The clock delivers pulses to the timer at different recurrent frequencies in accordance with the position of the switch S2.

The timer, which may for example be a synchronous motor driving a cam operated switch operating the control device for the motor so that the motor starts, is rotated a fixed amount and is then stopped. The intervals between the instants at which the motor starts and hence the time during which the material is exposed to radiation depends upon the setting of switch S2.

The switches S1 and S2 are ganged, so that the appropriate filter is chosen for the type of radiation likely to affect the strip for the time of exposure selected. The switch S1 is ganged with a switch S2 which connects clock pulses to a timer. These control the movement of the strip so that the strip is first located in the sampling region A and then in the region B for periods of time depending upon the radiation it is desired to investigate.

The motor drives the winding spools for the strip so that the strip is driven a fixed distance. Preferably the speed is slow so that the whole length of strip which has been exposed to radiation is progressed slowly past the detector.

While the pulses from the isotopes would be counted in a scaling circuit fed through filters 2 and 3, the air activities can be selected by filter No. 1, the output of which is recorded by an electro-mechanical register with print wheels giving a printed tape output. In this way a continuous record of the air concentration of the isotopes, e.g. Pu–239 and U–235 and U–238, can be obtained.

It will be understood that while the apparatus described as primarily applicable to detecting Pu–239, U–235 and U–238, clearly it is not so limited and can be employed for detecting other isotopes which emit distinguishable particles or radiation.

What we claim is:

1. Apparatus for detecting radiation in gases comprising a semi-conductor solid state detector, means for exposing a strip of material to said radiation, means for moving said irradiated strip into operative relationship with said detector, means for producing an electrical pulse output from said detector and means for analysing said pulse output to determine the nature of the radiation, said analysing means comprising a plurality of filters each passing pulses of a different pulse height band, selector switching means for rendering a required filter operative to pass pulses to a pulse counter and means for varying the length of time during which the said strip of material is exposed to the radiation in conformity with the type of radiation being detected.

2. Apparatus for detecting radiation in gases comprising a semi-conductor solid state detector, means for exposing a strip of material in a first zone to said radiation, winding means for moving said irradiated strip into a second zone where it is in operative relationship with said detector, means for producing an electrical pulse output from said detector and means for analysing said pulse output to determine the nature of the radiation, said analysing means comprising a plurality of filters each passing pulses of a different pulse height band to a pulse counter, selector switching means for rendering a required filter operative, control means for said winding means, means for actuating said control after a time interval to move a length of strip from said first zone to said second zone and switching means for varying the length of said time intervals in accordance with the type of radiation to be detected, said last mentioned switching means being ganged with the filter selector switch.

3. Apparatus for detecting radiation in gases comprising a semi-conductor solid state detector, means for exposing a strip of material to said radiation, means for moving said irradiated strip into operative relationship with said detector, means for producing an electrical pulse output from said detector and means for analysing said pulse output to determine the nature of the radiation, said analysing means comprising a plurality of filters each passing pulses of a different pulse height band, selector switching means for rendering a required filter operative to pass pulses to a pulse counter and means for varying the length of time during which the said strip of material is exposed to the radiation in conformity with the type of radiation being detected, each filter comprising a first gate which is rendered operative if the pulse height is above a predetermined lower level and a second gate which is rendered operative to pass pulses if the pulse height is above a predetermined upper limit said second gate serving to prevent pulses passing from said first gate.

References Cited by the Examiner

UNITED STATES PATENTS

| | | | |
|---|---|---|---|
| 2,943,199 | 6/60 | Konneker | 250—83.3 |
| 3,043,955 | 7/62 | Friedland | 250—83.3 |

OTHER REFERENCES

A continuous Monitor for Airborne Plutonium, by Collins, DP–188, AEC Research and Development Report, November 1956, 15 pages.

RALPH G. NILSON, *Primary Examiner*.

JAMES W. LAWRENCE, *Examiner*.